(12) United States Patent
Liu (10) Patent No.: US 10,457,103 B2
(45) Date of Patent: Oct. 29, 2019

(54) METHOD FOR DETERMINING TIRE INSTALLATION LOCATION, TIRE PRESSURE MONITORING DEVICE AND SYSTEM

(71) Applicant: Silergy Semiconductor Technology (Hangzhou) LTD, Hangzhou, ZheJiang Province (CN)

(72) Inventor: Chi-Kang Liu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/945,870

(22) Filed: Apr. 5, 2018

(65) Prior Publication Data

US 2018/0312021 A1 Nov. 1, 2018

(30) Foreign Application Priority Data

Apr. 26, 2017 (CN) .......................... 2017 1 0280588

(51) Int. Cl.
*B60C 23/04* (2006.01)
*H04Q 9/00* (2006.01)
*G08C 17/04* (2006.01)

(52) U.S. Cl.
CPC ...... *B60C 23/0489* (2013.01); *B60C 23/0416* (2013.01); *B60C 23/0486* (2013.01); *H04Q 9/00* (2013.01); *G08C 17/04* (2013.01); *H04Q 2209/40* (2013.01); *H04Q 2209/88* (2013.01)

(58) Field of Classification Search
CPC ................................................. B60C 23/0489
See application file for complete search history.

(56) References Cited

U.S. PATENT DOCUMENTS

| 7,392,119 B2 * | 6/2008 | Allard ................. B60C 23/0416 340/445 |
| 8,095,333 B2 | 1/2012 | Penot et al. |
| 8,421,612 B2 | 4/2013 | Sugiura |
| 8,498,785 B2 * | 7/2013 | Juzswik .............. B60C 23/0416 701/29.1 |
| 8,922,359 B2 * | 12/2014 | Lim .................... B60C 23/0486 340/444 |
| 9,420,408 B2 | 8/2016 | Liu |
| 9,849,736 B2 * | 12/2017 | Watanabe ........... B60C 23/0416 |
| 2009/0102636 A1 | 4/2009 | Tranchina |
| 2011/0205047 A1 | 8/2011 | Patel et al. |
| 2017/0282655 A1 | 10/2017 | Liu et al. |

* cited by examiner

*Primary Examiner* — Joseph H Feild
*Assistant Examiner* — Pameshanand Mahase
(74) *Attorney, Agent, or Firm* — Michael C. Stephens, Jr.

(57) ABSTRACT

Determining installation positions of tires can include: measuring, by a magnetic sensor provided in each tire in the same manner, a first magnetic field strength in a first direction and a second magnetic field strength in a second direction, where the first direction is a circumferential or axial direction of the tire and the second direction is a radial direction of the tire; acquiring a first magnetic field strength sampling value of the tire by sampling the first magnetic field strength; acquiring a second magnetic field strength sampling value of the tire by sampling the second magnetic field strength; calculating a difference between the first and second magnetic field strength sampling values; and determining whether the installation position of the tire is on the left or right side of a vehicle according to a change trend of the calculated difference of the tire.

13 Claims, 8 Drawing Sheets

METHOD FOR DETERMINING TIRE INSTALLATION LOCATION, TIRE PRESSURE MONITORING DEVICE AND SYSTEM

RELATED APPLICATIONS

This application claims the benefit of Chinese Patent Application No. 201710280588.4, filed on Apr. 26, 2017, which is incorporated herein by reference in its entirety.

FIELD OF THE INVENTION

The present invention generally relates to the field of pressure monitoring, and in particular to tire pressure monitoring systems and methods.

BACKGROUND

Tire pressure monitoring systems (TPMS) can be used to monitor the status of tires by recording the tire speed or by use of electronic sensors in the tires, in order to provide effective safety for the driving of motor vehicles. In one approach, an indirect tire pressure monitoring system can be used to determine whether the tire pressure is normal by the rotating speed difference. In another approach, a direct tire pressure monitoring system can utilize air pressure monitoring and temperature sensors in the tires. The air pressure and temperature of the tires may be monitored when the motor vehicles are driving or stationary. Alarms may go off when the tires are in a dangerous state (e.g., high pressure, low pressure, high temperature, etc.), in order to avoid potential traffic accidents caused thereby.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A tire pressure monitoring system (TPMS) refers to a device for monitoring tire pressure and maintaining proper pressure. The use of the tire pressure monitoring system plays an important role in ensuring the driving safety of the vehicle. In a tire pressure monitoring system, a sensor that detects the pressure is generally provided in the tire, and the detected tire pressure is transmitted to a data processing device of the vehicle for monitoring and prompting. In some approaches, a system may not only indicate the presence of tires with insufficient pressure, but can also indicate where the tires with insufficient pressure are installed. Thus, this approach convenient for users to perform maintenance. Since users will change the locations of tires during use, the locations of the tires cannot be automatically recognized based on the identification of the sensors or other device provided in the tires.

In one approach, a method for distinguishing whether a tire is mounted on the left side or the right side of a vehicle can be based on the phase changes in the magnetic field strength of different coils caused by the changes of the coil location when the tire is located on the left and right sides of the vehicle. However, this approach may acquire the change trend of the magnetic field strength in one cycle in order to track its phase. Therefore, the sampling rate of the magnetic field strength signal measured through the coil may be more than four times the tire rotation speed, which will cause a relatively large power consumption of the TPMS.

In another approach, it can be distinguished as to whether the tire is mounted on the left side or the right side of the vehicle by obtaining whether the movement track of the magnetic sensor with the tire is clockwise or counterclockwise through a two-axis magnetic sensor. However, a plurality of sampling values may be obtained during one-cycle rotation of the tire in order to obtain the movement track of the tire. Therefore, the sampling rate of the magnetic field strength signal measured through the coil may also be greater than four times the tire rotation speed.

In one embodiment, a method of determining installation positions of tires, can include: (i) measuring, by a magnetic sensor provided in each tire in the same manner, a first magnetic field strength in a first direction and a second magnetic field strength in a second direction, where the first direction is a circumferential or axial direction of the tire and the second direction is a radial direction of the tire; (ii) acquiring a first magnetic field strength sampling value of the tire by sampling the first magnetic field strength; (iii) acquiring a second magnetic field strength sampling value of the tire by sampling the second magnetic field strength; (iv) calculating a difference between the first magnetic field strength sampling value and the second magnetic field strength sampling value of the tire; and (v) determining whether the installation position of the tire is on the left side or the right side of a vehicle according to a change trend of the calculated difference of the tire. Particular embodiments also include tire pressure monitoring devices and systems.

Figure 1:
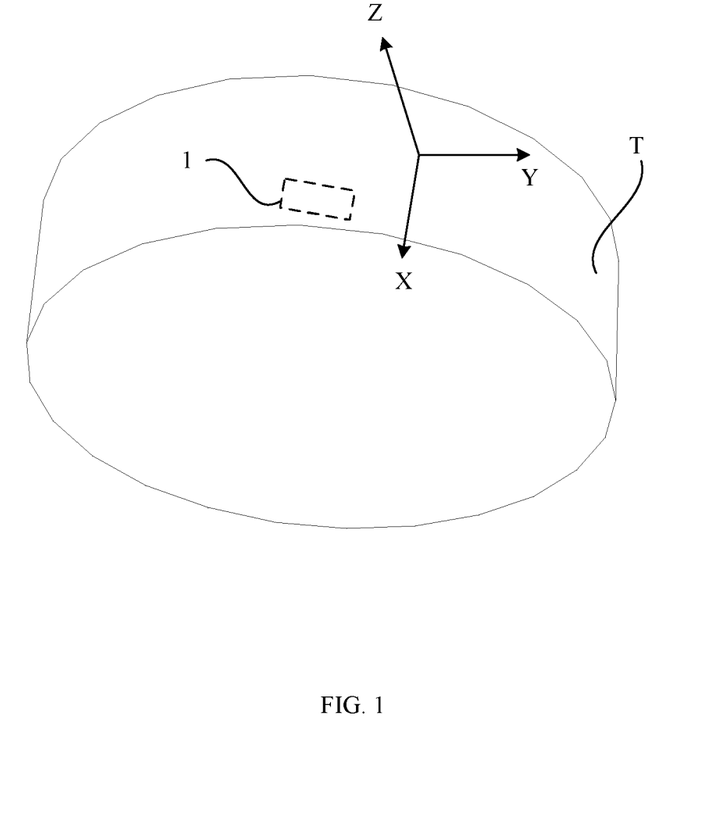
FIG. 1 is a schematic view of example installation of a tire pressure monitoring device, in accordance with embodiments of the present invention.

Referring now to FIG. 1, shown is a schematic view of example installation of a tire pressure monitoring device, in accordance with embodiments of the present invention. In this particular example, tire pressure monitoring device 1 may be mounted on the hub of tire T. Considering the industrial manufacturing and subsequent tire replacement requirements, tire pressure monitoring devices may be mounted within the tires in the same or a similar fashion (e.g., the same orientation and relative position) for the same model of tires. As described herein, the coordinate system of the tire pressure monitoring device with respect to the tire can be established as per FIG. 1, where the Y-axis of the coordinate system indicates the circumferential direction of the tire; that is, the direction of the tangent of the circular cross-section of the tire. The X-axis of the coordinate system may indicate the axial direction of the tire; that is, the axial direction directed from the inside to the outside of the cylinder of the tire or hub. The Z-axis of the coordinate system may indicate the radial direction of the tire. It should be understood that the above-mentioned coordinate axes are set only for reader convenience in understanding the principles of particular embodiments, and do not constitute any limitations to the present invention.

Figure 2:
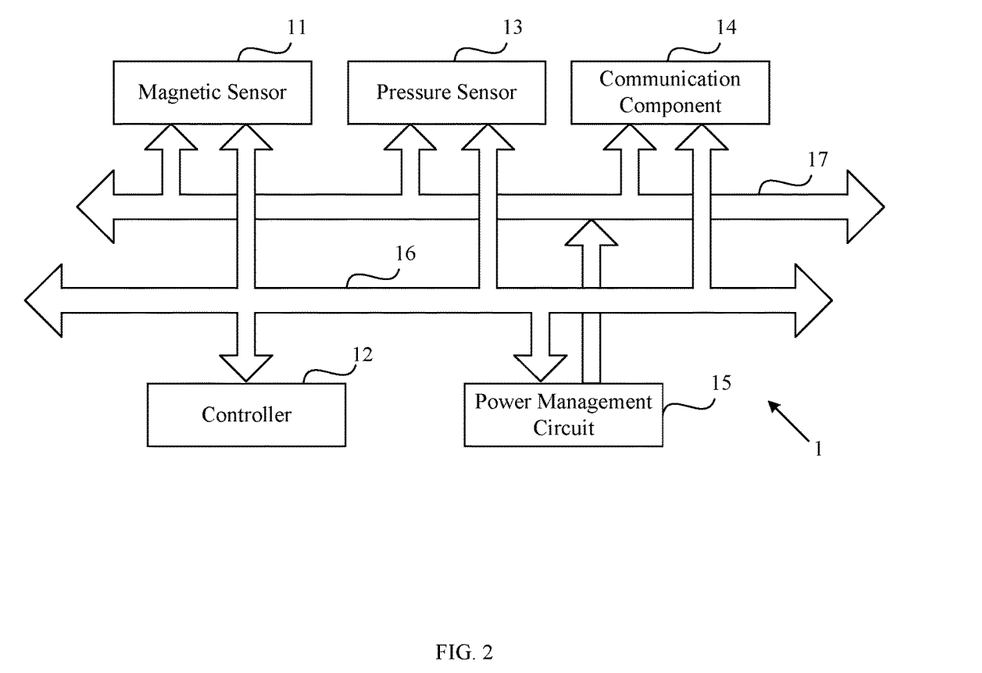
FIG. 2 is a block diagram of an example tire pressure monitoring device, in accordance with embodiments of the present invention.

Referring now to FIG. 2, shown is a block diagram of an example tire pressure monitoring device, in accordance with embodiments of the present invention. In this particular example, tire pressure monitoring device 1 can include magnetic sensor 11 and controller 12. Magnetic sensor 11 can be a two-axis or multi-axis magnetic sensor adapted to measure the magnetic field strength in at least two directions (e.g., the "first" magnetic field strength in the "first" direction, and the "second" magnetic field strength in the "second" direction). For example, the first direction is the Y-axis direction (either Y-axis positive or negative direction), or X-axis direction. The second direction is substantially perpendicular to the first direction; that is, the second direction is the Z-axis direction.

Magnetic sensor 11, which may also be referred to as a magnetometer, may be configured as a coil with a magnetic core disposed in a specific direction, and may generate a signal proportional to a magnetic flux change through magnetic sensor 11 according to Lenz's law. The larger and faster the magnetic flux changes through the coil, the greater the signal generated. For example, the signal value can be integrated such that the magnetic field value may be obtained while avoiding the speed effect. For example, a magnetic sensor with the Y-axis and Z-axis directions can measure the magnetic flux change generated in the Y-axis direction and the Z-axis direction, respectively. Alternatively, the magnetic sensor may also be fabricated by using an anisotropic magneto-resistance material.

The earth's magnetic field is similar to a bar magnet, with its magnetic south pole pointing toward the magnetic north pole. In the magnetic pole point, the magnetic field is perpendicular to the local horizontal plane, and on the equator, the magnetic field is parallel to the local horizontal plane, so the direction of the magnetic field is inclined to the ground in the northern hemisphere. The geomagnetic field is a vector, and for a fixed location, this vector can be decomposed into two components that are parallel to the local horizontal plane and a component that is perpendicular to the local horizontal plane. The magnetic sensor is simultaneously in the geomagnetic field and in the environmental magnetic field formed by the automobile's own electronic circuit, ferromagnetic body, and the like. When magnetic sensor 11 rotates with the tire to a different position, the relative positions of magnetic sensor 11 to the external magnetic field are different, so that the measured magnetic field strength in a specific direction also changes accordingly. This is detected by the magnetic sensor, thereby generating a variable magnetic field strength measurement value.

In particular embodiments, the installation position of the tire can be determined by using the different variations of the magnetic field strength in different directions. Controller 12 may be controlled by program instructions stored in an internal storage medium or an external storage medium, independently determining the installation position of the tires or in conjunction with a communicatively coupled data processing device. Controller 12 can be implemented by any suitable controlling device (e.g., a microcontroller, a programmable logic device [PLD], a field programmable gate array [FPGA], a digital signal processor [DSP], etc.). Tire pressure monitoring device 1 may also include other components, such as pressure sensor 13, communication component 14, power management circuit 15. Each circuit or module can be coupled with controller 12 via communication bus 16 for signal interaction. Each circuit/module can be coupled with power management circuit 15 via power bus 17 to obtain a power supply. Controller 12 can execute the method as shown in FIG. 3, in order to determine the installation position of the corresponding tire.

Figure 3:
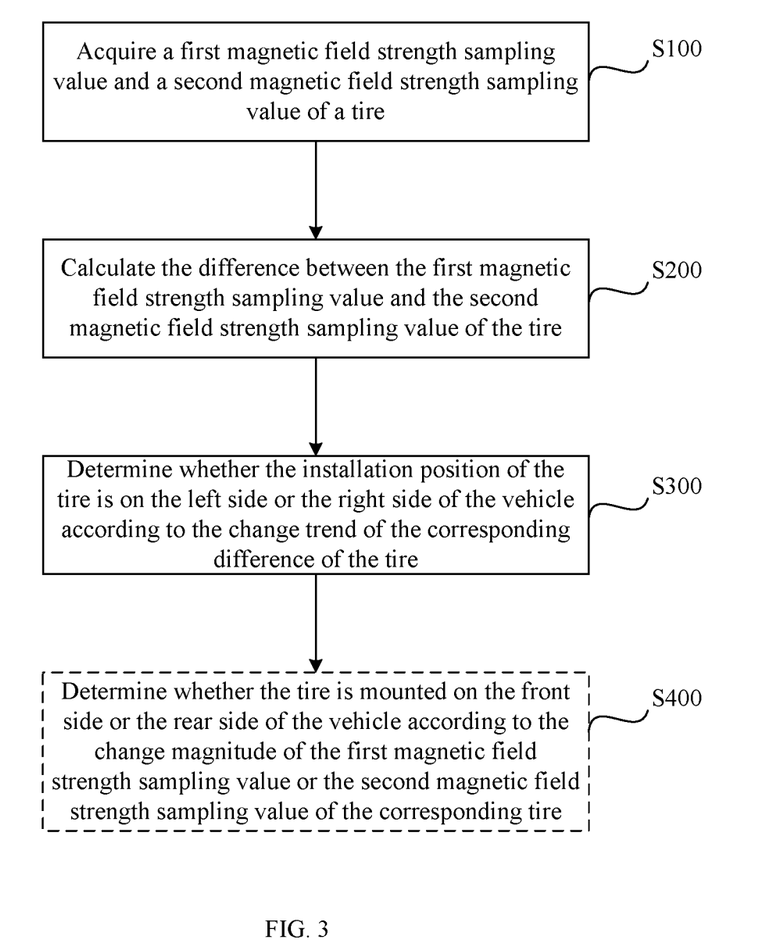
FIG. 3 is a flow diagram of an example method of determining a tire installation position, in accordance with embodiments of the present invention.

Referring now to FIG. 3, shown is a flow diagram of an example method of determining a tire installation position, in accordance with embodiments of the present invention. In this particular example, at S100, a first magnetic field strength sampling value and a second magnetic field strength sampling value of a tire can be acquired. For example, the first magnetic field strength sampling value is a sampling value of the magnetic field strength measured by the magnetic sensor in the first direction (e.g., Y-axis direction). Also for example, the second magnetic field strength sampling value is a sampling value of the magnetic field strength measured by the magnetic sensor in the second direction (e.g., Z-axis direction).

The sampling value may be acquired at a sampling rate related to the rotation speed of the tire, or at a predetermined sampling rate independent of the rotation speed of the tire. Of course, when power allows, sampling at a sampling rate greater than the rotation speed of the tire can further improve the accuracy of judgment, but this can disadvantageously increase the power consumption. At S200, the difference between the first magnetic field strength sampling value and the second magnetic field strength sampling value of the tire can be calculated. At S300, whether the installation position of the tire is on the left side or the right side of the vehicle can be determined according to the change trend of the corresponding difference of the tire.

Figure 4:
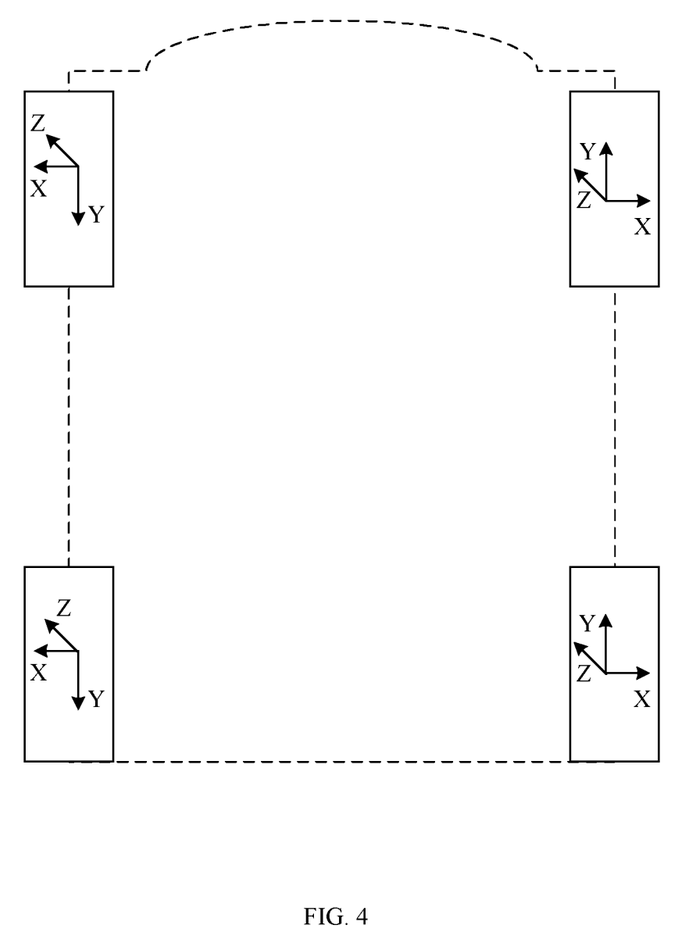
FIG. 4 is a schematic diagram of an example distribution of the tire pressure monitoring devices, in accordance with embodiments of the present invention.
Figure 5:
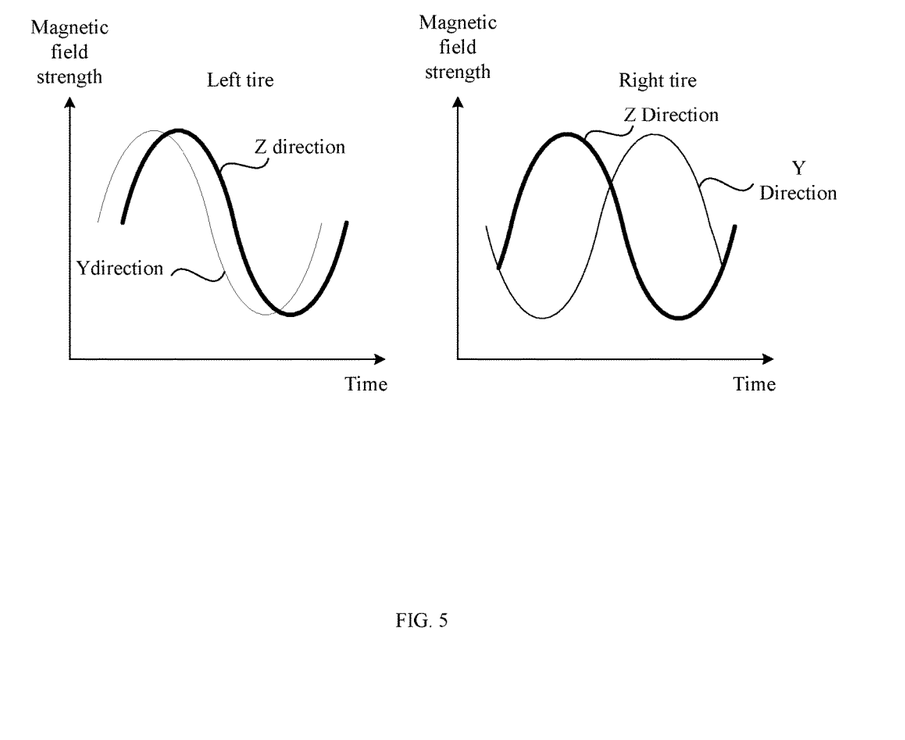
FIG. 5 is a curve diagram of an example magnetic field strength detected by magnetic sensors on a left tire and a right tire, in accordance with embodiments of the present invention.

Referring now to FIG. 4, shown is a schematic diagram of an example distribution of the tire pressure monitoring devices, in accordance with embodiments of the present invention. Also referring to FIG. 5, shown is a curve diagram of an example magnetic field strength detected by magnetic sensors on a left tire and a right tire, in accordance with embodiments of the present invention. In the example of FIG. 4, the magnetic sensor can measure the magnetic field strength in the Y-axis direction and the Z-axis direction. As shown in FIGS. 4 and 5, when the tire is mounted on the right and left sides of the vehicle, the Y directions (first direction) of the relative coordinate of the magnetic sensor are opposite. Further, when the tire rotates forward, the magnetic sensor on the left tire rotates counterclockwise, while the magnetic sensor on the right tire rotates clockwise. This makes the variation curve of the magnetic field strength in the Y direction measured by the magnetic sensor on the left tire have the opposite phase to the variation curve of the magnetic field strength in the Y direction measured by the magnetic sensor on right tire.

In the Z direction, as the tire rotates, the change trends of the magnetic field in both directions are the same, so in the Z direction, the variation curves of the magnetic field measured by the magnetic sensors on the left tire and the right tire are in phase with each other. Thus, a significant difference is shown between the variation curves of the magnetic field measured by the magnetic sensor on the left tire in the Y and Z directions, and the variation curves of the magnetic field measured by the magnetic sensor on the right tire in the Y and Z directions. In the example of FIG. 5, it can be seen that in the specific setting mode, for the left tire, the phase difference between the variation curves of the magnetic field in the Y and Z directions is maintained. This means that the magnetic fields in the Y and Z directions change synchronously. For the right tire, the change trends of the magnetic field in the Y and Z directions are basically opposite. Thus, in this way, it can be determined whether the tire is mounted on the left side or the right side by calculating the difference of the magnetic field strength in different directions on the same tire and tracking the change trend.

Figure 6:
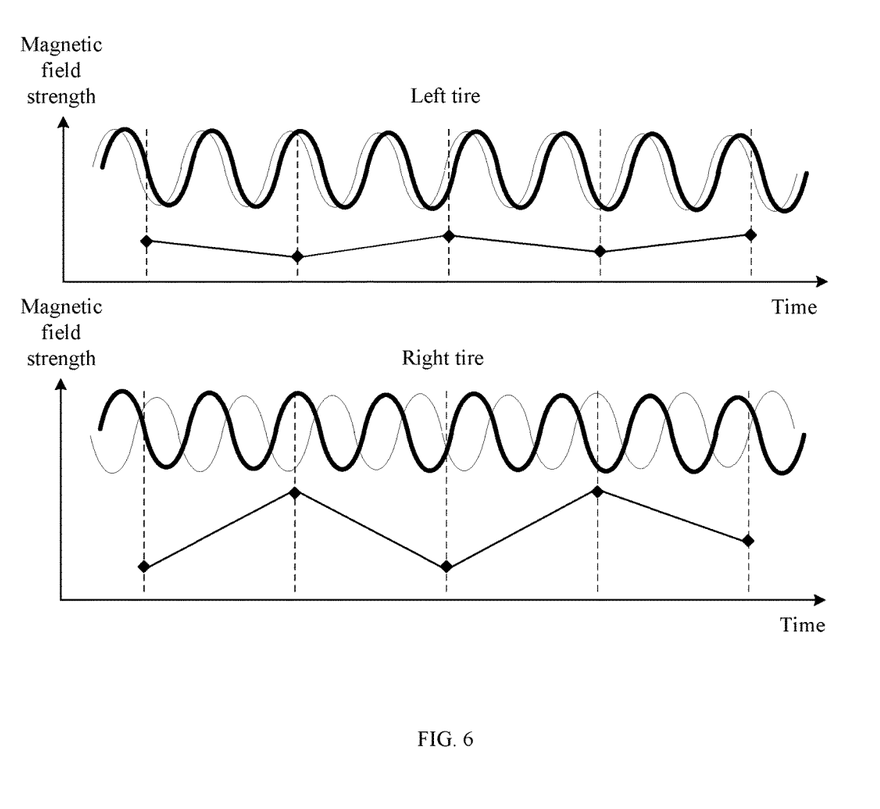
FIG. 6 is a schematic diagram of an example change trend of the difference between the magnetic field strengths of a left tire and a right tire, in accordance with embodiments of the present invention.

Referring now to FIG. 6, shown is a schematic diagram of an example change trend of the difference between the magnetic field strengths of a left tire and a right tire, in accordance with embodiments of the present invention. In this particular example, the change trends and the periods of the magnetic field strength in the Y and Z directions of the left tire are substantially the same. Therefore, the difference between the magnetic field strengths in the Y and Z directions may not significantly be changed with time. The difference in the magnetic field strength sampling value may also be relatively small. In addition, the change trends of the magnetic field strengths in the Y and Z directions of the right tire are basically opposite in this example, and the fluctuation of the difference between the magnetic field strengths in the Y and Z directions is relatively large. As such, even if sampling is performed at a small sampling frequency (e.g., less than the wheel rotation frequency), the change magnitude in the difference between the magnetic field strength sampling values in the Y and Z directions may remain relatively large.

Accordingly, controller 12 can determine whether the tire is mounted on the left side or the right side of the vehicle based on the change magnitude in the difference of the magnetic field strengths in different directions. Similarly, when the magnetic sensor is adapted to measure the magnetic field strengths in the X and Z directions, the X axis of the magnetic sensor on the left tire may have the opposite direction to the X axis of the magnetic sensor on the right tire, and both the Z axes may have the same direction. Therefore, the variation curves of the magnetic field strengths measured by the magnetic sensors on the tires of both sides in the X direction during the movement may have the opposite phase to each other, while the variation curves of the magnetic field strengths in the Z direction are substantially in phase. Thus, the installation position of the tire can also be determined by calculating the difference in the magnetic field strength sampling values in different directions and then tracking the change trend of the difference.

In the particular examples of FIGS. 5 and 6, for the left tire, the variation curves of the magnetic field strengths in different directions are substantially in phase, and for the right tire, the variation curves of the magnetic field strengths in different directions are substantially have the opposite phase. However, the above relationship may also be exchanged when the types or setting modes of the magnetic sensors are changed. One can recognize the change trend of the difference in the magnetic field strength sampling values of the left tire and the right tire in different directions under the predetermined setting mode of the magnetic sensor through experiments in advance, and may set instructions based on the change trend obtained through the experiments in order to control controller 12 to automatically determine the installation position of the tires.

In the present example, a biaxial magnetic sensor may be provided in the tire to measure at least the magnetic field strength in the circumferential or axial direction of the tire and the magnetic field strength in the radial direction. When the tire is mounted on the left and right sides, the directions that the magnetic sensor cuts the external magnetic field in the circumferential direction or the axial direction are opposite, and the directions that the magnetic sensor cuts the external magnetic field in radial direction are the same. Thus, whether the tire is mounted on the left side or the right side may be determined according to the change trends in the difference of the magnetic field strength sampling values in different directions. Since the directions that the magnetic sensor cuts the geomagnetic in the circumferential direction or the axial direction are opposite, the variation phases of the corresponding magnetic field strengths may also be opposite, while the variation phases of the magnetic field strengths in the other directions are the same. Thus, the difference of the magnetic field strength sampling values on the left and right sides is large, and the difference obtained at a lower sampling rate can still distinguish the tires on different sides. As a result, system power consumption can be effectively reduced and battery life can be improved in certain embodiments.

Referring back to FIG. 3, the method of this example may further include, at S400, determining whether the tire is mounted on the front side or the rear side of the vehicle according to the change magnitude of the first magnetic field strength sampling value or the second magnetic field strength sampling value of the corresponding tire. Thus, the installation positions of the tires in a four-wheel vehicle can accurately be determined in conjunction with the information of whether the tire is mounted on the left side or the right side determined in S300. Since the front side of the vehicle is typically provided with an engine and a large number of electronic circuits, the change magnitude of the magnetic field in the front side of the vehicle may be greater than in the rear side. Based on such characteristic, the tire provided in the front side and the tire provided in the rear side based can be distinguished.

Figure 7:
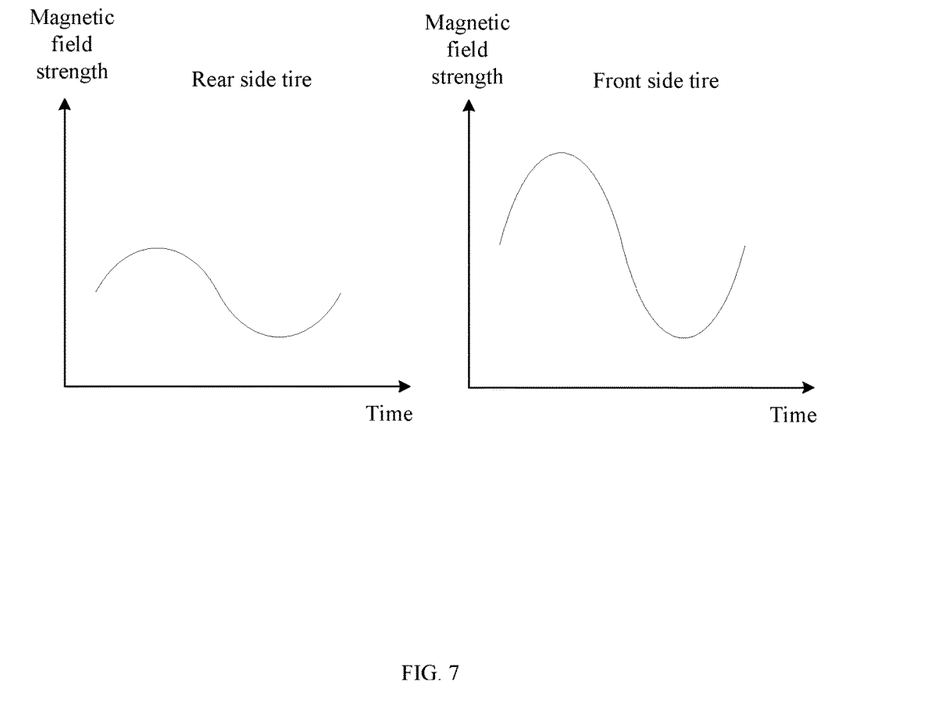
FIG. 7 is a curve diagram of example magnetic field strengths of a front tire and a rear tire, in accordance with embodiments of the present invention.

Referring now to FIG. 7, shown is a curve diagram of example magnetic field strengths of a front tire and a rear tire, in accordance with embodiments of the present invention. In this particular example, for the front tire, the measured change magnitude of the magnetic field strength is relatively large, while for the rear tire, the measured change magnitude of the magnetic field strength is relatively small. Thus, by doing experiments on the predetermined vehicle model, empirical data of the variation of the magnetic field strength on the front tire and the rear tire can be measured. By comparing the empirical data of variation of the magnetic field strength and the change magnitude, whether the tire is mounted on the front side or the rear side of the vehicle can be determined. For example, for some types of vehicles, because the front wheel will be affected by more metal materials of the vehicle, such as the engine, such that when the front wheel rotates, the magnetic field strength changes greatly. As another example, in an electric vehicle, the battery is typically placed in the rear side of the vehicle, which causes the magnetic field strength to change greatly when the front wheel rotates. For example, the empirical data of the variation of the magnetic field strength may be stored in the internal or external memory of the controller in the form of a data table or a database.

In this way, the installation position of the tire can be accurately determined in conjunction with the determination that the tire is mounted on the left side or the right side. It should be understood that the above S400 (see, e.g., FIG. 3) may be performed at the same time as S200-S300 for determining the left and right side, or in any other orders. In this example, the steps for determining the installation position of the tire may be performed by the tire pressure monitoring device of a corresponding tire. Tire pressure monitoring device 1 may send the determined installation position and status of the tire to the data processing device of the vehicle through communication component 14, in order to perform human-computer interaction. In other approaches, portions of determining the installation position of the tire can be performed in the tire pressure monitoring device, and other portions in the data processing device. For example, the sampling of the magnetic field strength signal may be performed by controller 12 of the tire pressure monitoring device, and the magnetic field strength sampling values of all tires measured in different directions may be transmitted to data processing device 2. The installation position of the tire can be determined by data processing device 2 according to the magnetic field strength sampling value.

Figure 8:
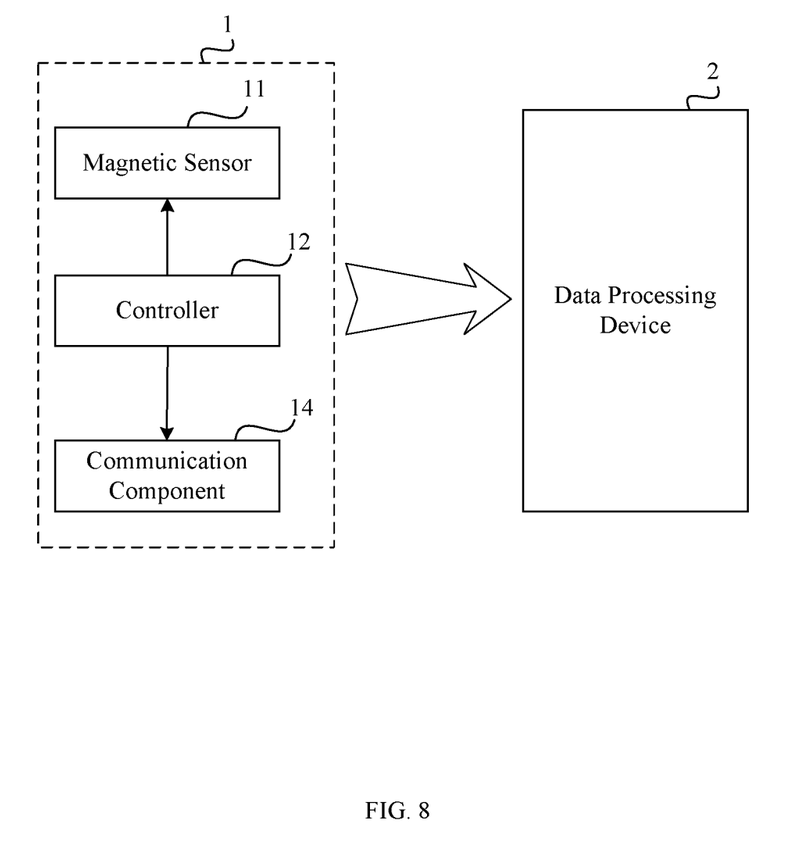
FIG. 8 is a block diagram of an example tire pressure monitor, in accordance with embodiments of the present invention.

Referring now to FIG. 8, shown is a block diagram of an example tire pressure monitor, in accordance with embodiments of the present invention. In this particular example, the tire pressure monitoring system can include tire pressure monitoring device(s) 1 and data processing device 2. Tire pressure monitoring devices 1 may be provided in each tire in the same manner. Each tire pressure monitoring device can include magnetic sensor 11, controller 12, and communication component 14. Magnetic sensor 11 can measure a first magnetic field strength in a first direction and a second magnetic field strength in a second direction, where the first direction is a circumferential direction or an axial direction of the tire, and the second direction is the radial direction of the tire. Controller 12 can acquire a first magnetic field strength sampling value and a second magnetic field strength sampling value for each tire and send them to data processing device 2 through communication component 14. The data processing device can calculate the difference between the first magnetic field strength sampling value and the second magnetic field strength sampling value of each tire, and determine whether the installation position of the tire is on the left side or the right side of the vehicle according to the change trend in the difference of each tire.

For example, the sampling rate for acquiring the first magnetic field strength sampling value and the second magnetic field strength sampling value of the tire may be lower than the tire rotation speed or is not related to the tire rotation speed. For example, the data processing device can determine whether the installation position of the tire is on the left side or the right side of the vehicle according to the change magnitude of the difference of the corresponding tire. Also for example, the data processing device can determine whether the installation position of the tire is on the front side or the rear side of the vehicle according to the change magnitude of the first magnetic field strength sampling value or the second magnetic field strength sampling of the corresponding tire.

In particular embodiments, a biaxial magnetic sensor may be provided in the tire to measure at least the magnetic field strength in the circumferential or axial direction of the tire and the magnetic field strength in the radial direction. When the tire is mounted on the left and right sides, the directions that the magnetic sensor cuts the external magnetic field in the circumferential direction or the axial direction are opposite. Also, the directions that the magnetic sensor cuts the external magnetic field in radial direction are the same, such that that whether the tire is mounted on the left side or the right side is determined according to the change trend in the difference of the magnetic field strength sampling value in different directions. Since the directions that the magnetic sensors on the left tire and the right tire cut the external magnetic field in the circumferential direction or the axial direction are opposite, the variation phases of the corresponding magnetic field strength are opposite, while the variation phases of the magnetic field strength in the other directions are the same. Thus, the difference in the magnetic field strength sampling value on the left and right sides is large, and the difference obtained at a lower sampling rate can still distinguish the tires on different sides. Therefore, the system consumption can be effectively reduced in certain embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of determining installation positions of tires, the method comprising:
   a) measuring, by a magnetic sensor provided in each tire in the same manner, a first magnetic field strength in a first direction and a second magnetic field strength in a second direction, wherein said first direction is a circumferential or axial direction of said tire and said second direction is a radial direction of said tire;
   b) acquiring, by a controller, a first magnetic field strength sampling value of said tire by sampling said first magnetic field strength received from said magnetic sensor;
   c) acquiring, by said controller, a second magnetic field strength sampling value of said tire by sampling said second magnetic field strength received from said magnetic sensor;
   d) calculating, by said controller, a difference between said first magnetic field strength sampling value and said second magnetic field strength sampling value of said tire;
   e) determining, by said controller, whether said installation position of said tire is on the left side or the right side of a vehicle according to a change trend of said calculated difference of said tire; and
   f) providing said installation position of said tire to a communication component, wherein said magnetic sensor, said communication component, and said controller receive a power supply from a power management circuit.

2. The method of claim 1, wherein a sampling rate for acquiring said first magnetic field strength sampling value and said second magnetic field strength sampling value of said tire is less than a tire rotation speed.

3. The method of claim 1, wherein said determining whether said installation position of said tire is on the left side or the right side of said vehicle comprises using a change magnitude of said calculated difference of said tire.

4. The method of claim 1, further comprising determining whether said installation position of said tire is on the front side or the rear side of said vehicle according to a change magnitude of at least one of said first magnetic field strength sampling value and said second magnetic field strength sampling value of said tire.

5. A tire pressure monitoring device for determining installation positions of tires, the tire pressure monitoring device comprising:
   a) a magnetic sensor provided in each tire in the same manner, wherein said magnetic sensor is configured to a first magnetic field strength in a first direction and a second magnetic field strength in a second direction, wherein said first direction is a circumferential or axial direction of said tire and said second direction is a radial direction of said tire;
   b) a controller configured to acquire a first magnetic field strength sampling value of said tire by sampling said first magnetic field strength, and a second magnetic field strength sampling value of said tire by sampling said second magnetic field strength;
   c) said controller being configured to calculate a difference between said first magnetic field strength sampling value and said second magnetic field strength sampling value of said tire; and
   d) said controller being configured to determine whether said installation position of said tire is on the left side or the right side of a vehicle according to a change trend of said calculated difference of said tire.

6. The tire pressure monitoring device of claim 5, wherein a sampling rate for acquiring said first magnetic field strength sampling value and said second magnetic field strength sampling value of said tire is less than a tire rotation speed.

7. The tire pressure monitoring device of claim 5, wherein said determination of whether said installation position of said tire is on the left side or the right side of said vehicle comprises using a change magnitude of said calculated difference of said tire.

8. The tire pressure monitoring device of claim 5, wherein said controller is configured to determine whether said installation position of said tire is on the front side or the rear side of said vehicle according to a change magnitude of at least one of said first magnetic field strength sampling value and said second magnetic field strength sampling value of said tire.

9. The tire pressure monitoring device of claim 5, further comprising a communication component coupled to said controller, and being configured to transmit said determined installation positions of said tires.

10. A tire pressure monitoring system, comprising:
   a) a plurality of tire pressure monitoring devices provided in each tire in the same manner;
   b) a data processing device communicatively coupled to said tire pressure monitoring devices;
   c) each of said plurality of tire pressure monitoring devices comprising a magnetic sensor for measuring a first magnetic field strength in a first direction and a second magnetic field strength in a second direction, wherein said first direction is a circumferential or axial direction of said tire and said second direction is a radial direction of said tire;
   d) each of said plurality of tire pressure monitoring devices further comprising a controller configured to acquire a first magnetic field strength sampling value and a second magnetic field strength sampling value of each tire, and to transmit to said data processing device; and
   e) said data processing device being configured to calculate a difference between said first magnetic field strength sampling value and said second magnetic field strength sampling value of each tire, and determining whether the installation position of said tire is on the left side or the right side of a vehicle according to a change trend in said difference of each tire.

11. The system of claim 10, wherein a sampling rate for acquiring said first magnetic field strength sampling value and said second magnetic field strength sampling value of said tire is less than a tire rotation speed or is not related to said tire rotation speed.

12. The system of claim 10, wherein said data processing device is configured to determine whether said installation position of said tire is on said left side or said right side of said vehicle according to the change magnitude of said difference of said tire.

13. The system of claim 10, wherein said data processing device is configured to determine whether said installation position of said tire is on the front side or the rear side of said vehicle according to said change magnitude of said first magnetic field strength sampling value or said second magnetic field strength sampling of said tire.

* * * * *